US008784696B2

(12) United States Patent
Wu

(10) Patent No.: US 8,784,696 B2
(45) Date of Patent: Jul. 22, 2014

(54) INTERMEDIATE TRANSFER MEMBERS CONTAINING INTERNAL RELEASE ADDITIVES

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 45 days.

(21) Appl. No.: 13/468,000

(22) Filed: May 9, 2012

(65) Prior Publication Data

US 2013/0299751 A1    Nov. 14, 2013

(51) Int. Cl.
*H01B 1/06* (2006.01)
*H01B 1/24* (2006.01)

(52) U.S. Cl.
USPC .......................................... 252/510; 399/308

(58) Field of Classification Search
USPC .................................. 252/502, 510; 399/308
See application file for complete search history.

(56) References Cited

U.S. PATENT DOCUMENTS

| 4,092,182 | A  | * | 5/1978  | Arbib et al. ...................... 148/23 |
| 5,455,136 | A  | * | 10/1995 | Yu et al. ..................... 430/58.65 |
| 5,744,273 | A  | * | 4/1998  | Malhotra ......................... 430/97 |
| 5,978,639 | A  |   | 11/1999 | Masuda et al. |
| 5,997,974 | A  | * | 12/1999 | Schlueter et al. ............... 428/58 |
| 6,139,784 | A  |   | 10/2000 | Oshima et al. |
| 6,397,034 | B1 | * | 5/2002  | Tarnawskyj et al. .......... 399/308 |
| 7,031,647 | B2 |   | 4/2006  | Mishra et al. |
| 7,130,569 | B2 |   | 10/2006 | Goodman et al. |
| 7,139,519 | B2 |   | 11/2006 | Darcy, III et al. |
| 7,781,133 | B2 |   | 8/2010  | Wu et al. |
| 8,247,142 | B1 | * | 8/2012  | Cote et al. ....................... 430/56 |
| 2010/0041803 | A1 | * | 2/2010 | Dershem ...................... 524/219 |
| 2010/0227157 | A1 | * | 9/2010 | Heuft et al. ................... 428/332 |
| 2011/0104479 | A1 | * | 5/2011 | Wu et al. ....................... 428/334 |

* cited by examiner

*Primary Examiner* — Mark Kopec
*Assistant Examiner* — William Young
(74) *Attorney, Agent, or Firm* — Eugene O. Palazzo

(57) ABSTRACT

An intermediate transfer member that includes a polyimide, a conductive component, and a carboxylic acid functionalized fluoro component.

13 Claims, 1 Drawing Sheet

INTERMEDIATE TRANSFER MEMBERS CONTAINING INTERNAL RELEASE ADDITIVES

This disclosure is generally directed to an intermediate transfer member that includes an internal release additive and an intermediate transfer member that includes a mixture of a polyimide, a carboxylic acid functionalized fluoro component, an optional polysiloxane, and an optional conductive component.

BACKGROUND

Intermediate transfer members selected for transferring a developed image in xerographic systems are known. For example, there are known intermediate transfer members that include materials with characteristics that cause these members to become brittle resulting in inadequate acceptance of a toner developed image and subsequent partial transfer of the developed image to a substrate like paper.

Also, known are intermediate transfer members that include a liquid fluoro agent, however, this agent is considered to be incompatible with polymers like polyimides obtained from polyamic acid coating solutions. The resulting polyimide phase separates, thus releasing of the polyimide from the coating is difficult to control.

A disadvantage relating to the preparation of an intermediate transfer member is that there is usually deposited a separate release layer on a metal substrate, and thereafter there is applied to the release layer the intermediate transfer member components, and where the release layer allows the components to be separated from the member by peeling or by the use of mechanical devices. Thereafter, the intermediate transfer member components are in the form of a film, which can be selected for xerographic imaging systems, or the film can be deposited on a supporting substrate like a polymer layer. The use of a separate intermediate release layer adds to the cost and time of preparation of intermediate transfer members, and such a layer can modify a number of the intermediate transfer member characteristics.

Intermediate transfer members that enable acceptable registration of the final color toner image in xerographic color systems using synchronous development of one or more component colors, and using one or more transfer stations, are known. However, a disadvantage of using an intermediate transfer member, in color systems, is that a plurality of developed toner transfer operations is utilized, thus sometimes causing charge exchange between the toner particles and the transfer member, which ultimately can result in less than complete toner transfer. This can result in low resolution images on the image receiving substrate like paper, and image deterioration. When the image is in color, the image can additionally suffer from color shifting and color deterioration.

There is a need for intermediate transfer members that substantially avoid or minimize the disadvantages of a number of known intermediate transfer members.

Also, there is a need for intermediate transfer member materials that possess self release characteristics from a number of substrates that are selected when such members are prepared.

Further, there is a need for intermediate transfer members with excellent wear and acceptable abrasion resistance, and which members possess improved stability with no or minimal degradation for extended time periods.

Another need relates to intermediate transfer members that have excellent conductivity or resistivity, and that possess acceptable humidity insensitivity characteristics leading to developed images with minimal resolution issues.

Additionally, there is a need for intermediate transfer members containing components that can be economically and efficiently manufactured, and where release additives and leveling agents are chemically incorporated into the intermediate transfer member coating composition.

Yet another need resides in providing intermediate transfer members where release additives need not be physically incorporated into the coating mixture in that such incorporation tends to form unwanted residues on metal substrates subsequent to release of the coating mixture.

A further need relates to providing intermediate transfer members that contain in the coating mixture utilized chemically interacted release agents thereby eliminating the cleaning of release fluids from the intermediate transfer members after curing.

These and other needs are achievable in embodiments with the intermediate transfer members and components thereof disclosed herein.

SUMMARY

Disclosed is an intermediate transfer member comprising a polyimide, an optional conductive component, and a carboxylic acid functionalized fluoro component of the following formulas $$HOOC(CF_2)_nCOOH$$

or $$C_nF_{2n+1}COOH$$

where n is a number of from about 2 to about 18.

Also disclosed is an intermediate transfer member comprising a coating of a polyimide, a conductive component, and carboxylic acid functionalized fluoro component, and wherein the carboxylic acid functionalized fluoro component chemically reacts with the polyimide to form a polymeric network of the polyimide, and the carboxylic acid functionalized fluoro component, and thereover a release fluoropolymer layer.

Further disclosed is an intermediate transfer member consisting of a thermosetting polyimide, a conductive component, and a carboxylic acid functionalized fluoro component, and wherein the carboxylic acid functionalized fluoro component is represented by the following formulas $$HOOC(CF_2)_nCOOH$$

or $$C_nF_{2n+1}COOH$$

where n represents the number of repeating units, and chemically reacts with the polyimide to form a polymeric network of the polyimide, and the carboxylic acid functionalized fluoro component, and wherein the polymeric network self releases from a metal substrate to form an intermediate transfer member film.

FIGURES

The following Figures are provided to further illustrate the intermediate transfer members disclosed herein.

EMBODIMENTS

There is disclosed herein an intermediate transfer member comprising a carboxylic acid functionalized fluoro component. The carboxylic acid functionalized fluoro component, such as a dodecafluorosuberic acid, enables or assists in enabling self release of an intermediate transfer member film from a substrate like a metal substrate, such as stainless steel, thereby avoiding the need for a separate release layer on the substrate.

More particularly, there is provided herein an intermediate transfer member comprising a mixture in the configuration of a layer, of a polyimide, and more specifically, a thermosetting polyimide, a conductive component, and a carboxylic acid functionalized fluoro component that enables or assists in enabling self release from a metal substrate, such as stainless steel, and where there is avoided the need for a separate release layer on the substrate.

Figure 1:
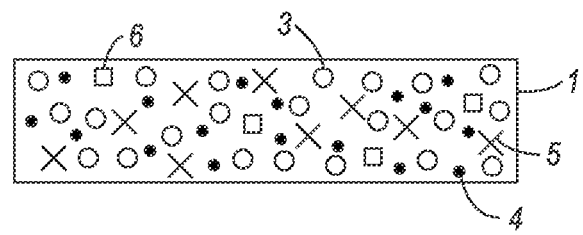
FIG. 1 illustrates an exemplary embodiment of a one-layer intermediate transfer member of the present disclosure.

In FIG. 1 there is illustrated an intermediate transfer member comprising a layer 1 of a polymer, such as a polyimide 3, a carboxylic acid functionalized fluoro component acid 4, an optional siloxane polymer 5, and an optional conductive component 6. Upon heating the polymer and the carboxylic acid, functionalized fluoro component react, it is believed, to form a polymeric network.

Figure 2:
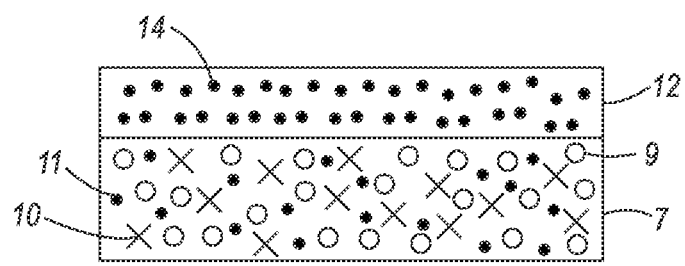
FIG. 2 illustrates an exemplary embodiment of a two-layer intermediate transfer member of the present disclosure.

In FIG. 2 there is illustrated a two-layer intermediate transfer member comprising a bottom layer 7, comprising upon heating a chemically reacted mixture 9, of a polymer, such as a polyimide and a carboxylic acid functionalized fluoro component acid, an optional siloxane polymer 10, and a conductive component 11, and an optional top or outer toner release layer 12 comprising release components 14.

Figure 3:
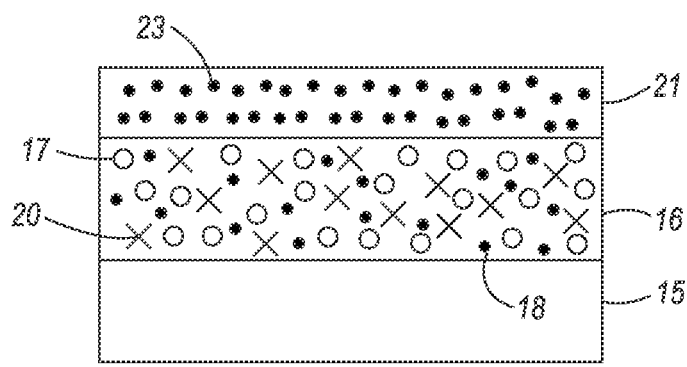
FIG. 3 illustrates an exemplary embodiment of a three-layer intermediate transfer member of the present disclosure.

In FIG. 3 there is illustrated a three layer intermediate transfer member comprising a supporting substrate 15, a layer 16 comprising the reaction product of a thermosetting polyimide and a carboxylic acid functionalized fluoro component 17; a conductive component 18, an optional siloxane polymer 20, and an optional release layer 21 comprising release components 23.

There is disclosed a self-releasing intermediate transfer member composition that generally comprises a thermosetting polyimide, a carboxylic acid functionalized fluoro component, such as dodecafluorosuberic acid, a conductive component, such as carbon black, and an optional polysiloxane. In embodiments, the carboxylic acid functionalized fluoro component can be mixed with, reacted with, interacted with a polymer, such as a polyimide material. Thus, in particular embodiments, there is disclosed a self-releasing intermediate transfer member that generally comprises a polyimide, such as a polyimide generated from polyamic acid like biphenyl tetracarboxylic dianhydride/4,4-oxydianiline, and a carboxylic acid functionalized fluoro component internal release additive/leveling agent. The carboxylic acid functionalized fluoro component is caused by, for example, heating to chemically react with the polyamic acid to form a polyimide carboxylic acid functionalized fluoro component network, and which member has excellent release and stability characteristics, smooth high quality surfaces, and acceptable mechanical properties.

The intermediate transfer members disclosed herein exhibit self release characteristics, and where the use of an external release layer present on, for example, a stainless steel substrate is avoided; have excellent mechanical strength while permitting the rapid and complete transfer from about 90 to about 99 percent, and from about 95 to about 100 percent transfer of a xerographic developed image; possess a Young's modulus of, for example, from about 3,500 to about 10,000 Mega Pascals (MPa), or from about 5,000 to about 9,000 MPa, or from about 6,000 to about 8,000 MPa; a break strength of from about 150 to about 300 MPa, or from about 175 to about 250 MPa; a CTE (coefficient of thermal expansion) of from about 10 to about 50 ppm/° K, or from about 15 to about 30 ppm/° K; and an excellent resistivity as measured with a known High Resistivity Meter of, for example, from about $10^8$ to about $10^{13}$ ohm/square, from about $10^9$ to about $10^{13}$ ohm/square, from about $10^9$ to about $10^{12}$ ohm/square, or from about $10^{10}$ to about $10^{12}$ ohm/square.

Self-release characteristics without the assistance of any external sources, such as prying devices, permits the efficient, economical formation, and full separation, from about 90 to about 100 percent, and from about 95 to about 99 percent of the disclosed intermediate transfer member compositions and films from substrates, such as steel, upon which the members are initially prepared in the form of a film, and where the use of release materials and separate release layers can be avoided. The time period to obtain the self-release characteristics varies depending, for example, on the components and the amounts thereof selected for the carboxylic acid functionalized fluoro component containing compositions disclosed. Generally, however, this time period is from about 1 to about 60 seconds, from about 1 to about 40 seconds, from about 1 to about 25 seconds, from about 1 to about 15 seconds, or from 1 to about 5 seconds, and in some instances less than about 1 second.

The intermediate transfer members of the present disclosure can be provided in a variety of configurations, such as a one-layer configuration, or in a multi-layer configuration. More specifically, the final intermediate transfer member may be in the form of an endless flexible belt, a web, a flexible drum or roller, a rigid roller or cylinder, a sheet, a drelt (a cross between a drum and a belt), a seamless belt that is with an absence of any seams or visible joints in the members, and the like.

Release Additives

Examples of internal release additives include acid functionalized fluoro components of the following two formulas $$HOOC(CF_2)_n COOH$$

or $$C_n F_{2n+1} COOH$$

where n represents the number of atoms, and more specifically, where n is a number of from about 2 to about 18, from about 2 to about 12, from about 2 to about 5, or from about 2 to about 10, and which additives are present in an amount of, for example, from about 0.05 to about 10 weight percent, from about 0.01 to about 10 weight percent, from about 0.1 to about 5 weight percent, from about 0.2 to about 2 weight percent, from about 0.1 to 3.5 weight percent or from about 0.1 to about 2.5 weight percent, and in embodiments less than about or equal to about 1 weight percent, and where the weight percent is based on the total solids, such as the solids of the reacted polyimide acid functionalized fluoro component, and the conductive component.

Specific examples of carboxylic acid functionalized fluoro components include octafluoroadipic acid $HOOC(CF_2)_4COOH$, dodecafluorosuberic acid $HOOC(CF_2)_6COOH$, hexadecafluorosebacic acid $HOOC(CF_2)_8COOH$, heptadecafluoro-n-nonanoic acid $CF_3(CF_2)_7COOH$, nonadecafluorodecanoic acid $CF_3(CF_2)_8COOH$, nonafluorovaleric acid $CF_3(CF_2)_3COOH$, pentadecafluorooctanoic acid $CF_3(CF_2)_6COOH$, and undecafluorohexanoic acid $CF_3(CF_2)_4COOH$, and the like, and mixtures thereof.

While not desiring to be limited by theory, it is believed that the carboxylic acid functionalized fluoro component chemically interacts with, or reacts with the polyamic acid selected, thus generating a polyimide network instead of being physically mixed or blended thereof. Therefore, in embodiments of the present disclosure, it is believed that the carboxylic acid groups of the carboxylic acid functionalized fluoro components chemically react by heating or curing with the aniline groups of polyamic acid to form amide bonds.

Polyimide Polymers

Examples of intermediate transfer member polyimides include known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes, and generally have, as determined by known GPC analysis, a number average molecular weight of from about 5,000 to about 500,000 or from about 10,000 to about 100,000, and a weight average molecular weight of from about 50,000 to about 5,000,000 or from about 100,000 to about 1,000,000.

Also, for the intermediate transfer member disclosed there can be selected thermosetting polyimides that can be cured at temperatures above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Additionally, suitable polyimides that may be selected for the disclosed intermediate transfer members are known thermosetting polyimides formed from the imidization, by heating and curing, of a polyamic acid, or a polyimide precursor. Examples of these thermosetting polyimides include the imidization of at least one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. The heating and curing may be at temperatures that are suitable to cause the imidization of the polyamic acid, which temperature is believed to be from about 235° C. to about 340° C., from about 260° C. to about 325° C., from about 275° C. to about 300° C., from about 260° C. to about 325° C., or from about 260° C. to about 325° C.

Commercially available examples of the selected polyamic acids of pyromellitic dianhydride/4,4-oxydianilines are PYRE-ML® RC5019 (about 15 to about 16 weight percent in N-methyl-2-pyrrolidone, NMP), RC5057 (about 14.5 to about 15.5 weight percent in NMP/aromatic hydrocarbon, ratio of 80/20), and RC5083 (about 18 to about 19 weight percent in NMP/DMAc, ratio of 15/85), obtainable from Industrial Summit Technology Corporation, Parlin, N.J.; and DURIMIDE® 100, commercially available from FUJIFILM Electronic Materials U.S.A., Inc.

Examples of polyamic acids of biphenyl tetracarboxylic dianhydride/4,4'-oxydianilines that may be selected for the generation of the polyimides for the disclosed intermediate transfer members include U-VARNISH A™ and VARNISH S™ (about 20 weight in NMP), both available from UBE America Inc., New York, N.Y. Polyamic acids of biphenyl tetracarboxylic dianhydride/phenylenediamine examples include PI-2610 (about 10.5 weight in NMP), and PI-2611 (about 13.5 weight in NMP), both available from HD MicroSystems, Parlin, N.J.

Further examples of polyimides that may be selected for the disclosed intermediate transfer member can be obtained from the curing at temperatures of from about 260° C. to about 325° C. of polyamic acids of benzophenone tetracarboxylic dianhydride/4,4'-oxydianilines, such as RP46 and RP50 (about 18 weight percent in NMP), both available from Unitech Corp., Hampton, Va. Commercially obtainable from HD MicroSystems, Parlin, N.J., examples of polyamic acids of benzophenone tetracarboxylic dianhydride/4,4'-oxydianiline/phenylenediamines that can be selected are PI-2525 (about 25 weight percent in NMP), PI-2574 (about 25 weight percent in NMP), PI-2555 (about 19 weight percent in NMP/aromatic hydrocarbon, ratio of 80/20), and PI-2556 (about 15 weight percent in NMP/aromatic hydrocarbon/propylene glycol methyl ether, ratio of 70/15/15).

Examples of polyamic acids or esters of polyamic acid that can be imidized by curing can be generated by the reaction of a dianhydride and a diamine. Suitable dianhydrides selected for the reaction include aromatic dianhydrides and aromatic tetracarboxylic acid dianhydrides, such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis(3,4-dicarboxyphenoxy) phenyl) hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis (3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3, 4-dicarboxyphenyl)methane dianhydride, 4,4'-(p-phenylenedioxy)diphthalic dianhydride, 4,4'-(m-phenylenedioxy)

diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like.

Exemplary diamines selected for the reaction with the dianhydrides include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diamino-diphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl]ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, 2,2-di(p-aminophenyl)-1,1,1,3,3,3-hexafluoropropane, and the like, and mixtures thereof.

The dianhydride and diamine reactants can be selected in various suitable amounts, such as for example a weight ratio of dianhydride to diamine of from about 20:80 to about 80:20, from about 40/60 to about 60/40, and about a 50/50 weight ratio.

Moreover, polyimide examples that can be selected for chemical interaction with carboxylic acid functionalized fluoro components are represented by the following formulas/structures

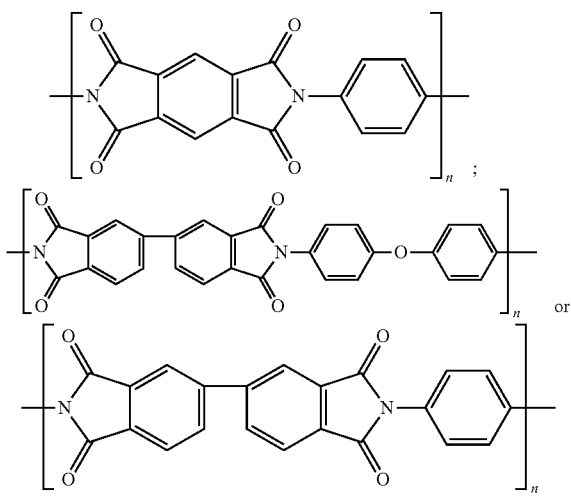

where n represents the number of repeating segments, such as for example from about 30 to about 300, from about 75 to about 225, or from about 100 to about 175.

The polymeric film-forming material, such as a polyimide or precursor thereof, can be present in the intermediate transfer member carboxylic acid functionalized fluoro component network composition in the ratios as illustrated herein, and in various effective amounts, such as for example, from about 70 to about 97 weight percent, from about 70 to about 95 weight percent, from about 75 to about 95 weight percent, or from about 80 to about 90 weight percent, based on the weight of components present of the polyimide polymer, the carboxylic acid functionalized fluoro component, and when present the conductive component, and where the total of the polyimide polymer and the carboxylic acid functionalized fluoro component is about 100 percent. Therefore, the carboxylic acid functionalized fluoro component is present in the polyimide network in an amount of from about 30 to about 3 weight percent, from about 30 to about 5 weight percent, from about 25 to about 5 weight percent, or from about 20 to about 10 weight percent.

Polysiloxane Polymers

The intermediate transfer member can also generally comprise a polysiloxane polymer. Examples of polysiloxane polymers selected for the intermediate transfer member mixture disclosed herein include known suitable polysiloxanes, such as a polyether modified polydimethylsiloxane, commercially available from BYK Chemical as BYK® 333, BYK® 330 (about 51 weight percent in methoxypropylacetate), and BYK® 344 (about 52.3 weight percent in xylene/isobutanol, ratio of 80/20); BYK®-SILCLEAN 3710 and BYK® 3720 (about 25 weight percent in methoxypropanol); a polyester modified polydimethylsiloxane, commercially available from BYK Chemical as BYK® 310 (about 25 weight percent in xylene) and BYK® 370 (about 25 weight percent in xylene/alkylbenzenes/cyclohexanone/monophenylglycol, ratio of 75/11/7/7); a polyacrylate modified polydimethylsiloxane, commercially available from BYK Chemical as BYK®-SILCLEAN 3700 (about 25 weight percent in methoxypropylacetate); a polyester polyether modified polydimethylsiloxane, commercially available from BYK Chemical as BYK® 375 (about 25 weight percent in di-propylene glycol monomethyl ether); and the like, and mixtures thereof.

The polysiloxane polymer, or copolymers thereof can be present in the intermediate transfer member mixture in various effective amounts, such as from about 0.01 to about 1 weight percent, from about 0.05 to about 1 weight percent, from about 0.05 to about 0.5 weight percent, or from about 0.1 to about 0.3 weight percent based on the weight of components present in the initial mixture prior to curing, such as of the mixture of the polyimide polymer, a carboxylic acid functionalized fluoro component, a polysiloxane polymer, and when present the conductive component.

Optional Fillers

Optionally, the intermediate transfer member may contain one or more conductive components or fillers to, for example, alter and adjust the conductivity of the intermediate transfer member. Where the intermediate transfer member is a one layer structure, the conductive filler can be included in the carboxylic acid functionalized fluoro component containing mixture disclosed herein. However, where the intermediate transfer member is a multi-layer structure, the conductive filler can be included in one or more layers of the member, such as in the supporting substrate, the polymer mixture layer coated thereon, and in both the supporting substrate and the polymer mixture layer.

Any suitable filler can be used that provides the desired results. For example, suitable fillers include carbon blacks, metal oxides, polyanilines, other known suitable fillers, and mixtures of fillers.

Examples of carbon black fillers that can be selected for the intermediate transfer members illustrated herein include special black 4 (B.E.T. surface area=180 m$^2$/g, DBP absorption=1.8 ml/g, primary particle diameter=25 nanometers) available from Evonik-Degussa, special black 5 (B.E.T. surface area=240 m$^2$/g, DBP absorption=1.41 ml/g, primary particle diameter=20 nanometers), color black FW1 (B.E.T. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); special carbon blacks available from Evonik Incorporated; and Channel carbon blacks available from Evonik-Degussa. Other known suitable carbon blacks not specifically disclosed herein may be selected as the filler or conductive component for the intermediate transfer members disclosed herein.

Examples of polyaniline fillers that can be selected for incorporation into the intermediate transfer members are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer members include, for example, tin oxide, antimony doped tin oxide, indium oxide, indium tin oxide, zinc oxide, and titanium oxide, and the like.

When present, the filler can be selected in an amount of, for example, from about 1 to about 60 weight percent, from about 3 to about 40 weight percent, from about 4 to about 30 weight percent, from about 10 to about 30 percent, from about 3 to about 30 weight percent, from about 8 to about 25 weight percent, or from about 13 to about 20 weight percent of the total solids of the polymer layer that contains, for example, a polyimide, a conductive component, and the carboxylic acid functionalized fluoro component.

Optional Release Layer

If desired, an optional release layer can be included in the intermediate transfer member, such as over the dodecafluorosuberic acid layer mixture illustrated herein. The release layer can be included to assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, from about 10 to about 75 microns, or from about 20 to about 50 microns.

The optional release layer can comprise TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc., such as 4-bromoperfluorobutene-1,1,1-dihydro-4-bromoperfluorobutene-1,3-bromoperfluoropropene-1,1,1-dihydro-3-bromoperfluoropropene-1, or any other suitable known commercially available cure site monomers.

Intermediate Transfer Member Formation

The intermediate transfer member mixtures illustrated herein comprising a carboxylic acid functionalized fluoro component, a polyimide, an optional polysiloxane, and a conductive filler component, can be formulated into an intermediate transfer member by any suitable method. For example, with known milling processes, uniform dispersions of the intermediate transfer member mixtures can be obtained, and then coated on individual metal substrates, such as a stainless steel substrate or the like, using known draw bar coating or flow coating methods. The resulting individual film or films can be dried at high temperatures, such as by heating the films at from about 100° C. to about 400° C., from about 75° C. to about 320° C., or from about 160° C. to about 320° C., for a suitable period of time, such as from about 20 to about 180 minutes, from about 40 to about 120 minutes, or about 30 minutes to about 60 minutes while remaining on the substrates. After drying and cooling to room temperature, about 23° C. to about 25° C., the films self release from the steel substrates, that is the films release without any external assistance. The resultant intermediate transfer film product can have a thickness of, for example, from about 15 to about 150 microns, from about 20 to about 100 microns, or from about 25 to about 75 microns.

As metal substrates selected for the deposition of the mixture disclosed herein, there can be selected stainless steel, aluminum, nickel, copper, and their alloys, glass plates, and other conventional typical known materials.

Examples of solvents selected for formation of the intermediate transfer member compositions, which solvents can be selected in an amount of, for example, from about 60 to about 95 weight percent, or from about 70 to about 90 weight percent of the total mixture components weight include alkylene halides, such as methylene chloride, tetrahydrofuran, toluene, monochlorobenzene, N-methyl-2-pyrrolidone, N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents selected for the intermediate transfer member mixtures. Examples of diluents added to the solvents in amounts of from about 1 to about 25 weight percent, and from 1 to about 10 weight percent based on the weight of the solvent and the diluent are known diluents like aromatic hydrocarbons, ethyl acetate, acetone, cyclohexanone and acetanilide.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids of all the components unless otherwise indicated. The viscosity values were determined by a viscometer.

COMPARATIVE EXAMPLE 1

A coating composition was prepared by stirring a mixture of Special Carbon Black 4 obtained from Evonik Incorporated, and a polyamic acid of biphenyl tetracarboxylic dianhydride/4,4'-oxydianiline, available as BPDA resin from Kaneka Corporation, in a ratio of 12/88 based on the initial mixture feed amounts, in N-methyl-2-pyrrolidone (NMP), about 16 weight solids. The obtained intermediate transfer member dispersion was coated on a stainless steel substrate of a thickness of 0.5 millimeter, and subsequently the mixture was cured by heating at 125° C. for 30 minutes, 190° C. for 30 minutes, and 320° C. for 60 minutes. The resulting intermediate transfer member film comprised of the above components in the ratios indicated did not self release from the stainless substrate, but rather adhered to this substrate. After being immersed in water for 3 months, the intermediate transfer member film obtained eventually self released from the substrate.

EXAMPLE I

There was prepared by admixing with stirring, a coating composition comprising Special Carbon Black 4, obtained from Evonik Incorporated, a polyamic acid of biphenyl tetracarboxylic dianhydride/4,4'-oxydianiline available as BPDA resin from Kaneka Corporation, and dodecafluorosuberic acid, obtained from TCI America Corporation, in a ratio of 12/87/1 based on the initial mixture feed amounts, in N-ethyl-2-pyrrolidone, about 16 weight solids. The obtained intermediate transfer member coating dispersion was coated on a stainless steel substrate of a thickness of 0.5 millimeter, and subsequently, the mixture was cured by heating at 125° C. for 30 minutes, 190° C. for 30 minutes, and 320° C. for 60 minutes, where the curing enabled the chemical reaction to occur between the formed polyimide and the dodecafluorosuberic acid. The resulting intermediate transfer member film comprised of the above ingredients of Special Carbon Black 4, the polyimide formed from the curing by heating of the polyamic acid of biphenyl tetracarboxylic dianhydride/4,4'-oxydianiline and the dodecafluorosuberic acid, and in the ratios indicated, immediately self released, less than one second, from the stainless steel without the assistance of any external processes. There resulted an 80 micron thick smooth intermediate transfer film of the above components in a ratio of 12/87/1, which film can then be deposited on a supporting substrate, such as a polymer as disclosed herein.

EXAMPLE II

An intermediate transfer member is prepared by repeating the processes of Example I except there is selected in place of the polyamic acid of biphenyl tetracarboxylic dianhydride/4,4'-oxydianiline available as BPDA resin, the polyimide generated from a polyamic acid of biphenyl tetracarboxylic dianhydride/4,4'-oxydianiline (U-VARNISH A obtained from UBE America Incorporated), a polyamic acid of biphenyl tetracarboxylic dianhydride/phenylenediamine (PI-2610 obtained from HD MicroSystems), a polyamic acid of benzophenone tetracarboxylic dianhydride/4,4'-oxydianiline (RP50 obtained from Unitech Corporation), or a polyamic acid of benzophenone tetracarboxylic dianhydride/4,4'-oxydianiline/phenylenediamine (PI-2525 obtained from HD MicroSystems).

MEASUREMENTS

The above intermediate transfer members of Example I and the Comparative Example 1 were measured for Young's Modulus following the known ASTM D882-97 process. Samples (0.5 inch×12 inch) of each intermediate transfer member were placed in the Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by the load divided by the average cross sectional area of each of the test samples. The results are provided in Table 1.

The surface resistivity of the above intermediate transfer members of Example I and Comparative Example 1 were also measured using a High Resistivity Meter, and the results are provided in Table 1.

TABLE 1

|  | Surface Resistivity (ohm/sq) | Young's Modulus (MPa) | Break Strength (MPa) | Release Time from the Metal Substrate |
|---|---|---|---|---|
| Comparative Example 1 | $6.9 \times 10^9$ | 8,000 | 183 | Poor, did not self release |
| Example I | $8.2 \times 10^9$ | 7,900 | 180 | Excellent, released in less than one second |

Chemical incorporation of the dodecafluorosuberic acid that reacted with the polyimide into the intermediate transfer member film had substantially no negative impacts on both mechanical and electrical properties of the intermediate transfer member film of Example I.

Also, the intermediate transfer member of Example I self released quickly from the substrate without the need to apply an additional release layer on the stainless steel, while the Comparative Example 1 did not self release and remained on the stainless steel substrate, being released only after immersed in water for three months.

The intermediate transfer members of Example I and Comparative Example 1 were further tested for their thermal expansion coefficients (CTE) using a Thermo-mechanical Analyzer (TMA). The intermediate transfer member samples were cut using a razor blade and metal die to 4 millimeter wide pieces which were then mounted between the TMA clamp using a measured 8 millimeter spacing. The samples were preloaded to a force of 0.05 Newtons (N). Data was analyzed from the $2^{nd}$ heat cycle. The CTE value was obtained as a linear fit through the data between the temperature points of interest of from about a $-20°$ C. to about $50°$ C. regions using the TMA software.

The CTE for the Example I member was about 16.8 ppm/° K, which was similar to the Comparative Example 1 member with a CTE of about 19.0 ppm/° K.

The Example I intermediate transfer member was obtained at a lower cost, about 50 percent lower than a number of known intermediate transfer members that were free of the dodecafluorosuberic acid in that the Example I member does not require an added release layer coating on a stainless steel substrate when the member is initially prepared.

After being released from the stainless steel substrate, the Example I intermediate transfer film obtained can be used as an intermediate transfer member, can be coated onto a supporting substrate, such as a polyimide, or optional release layer can be coated on top of the Example I intermediate transfer layer film.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a mixture of a polyimide, a conductive component, and a carboxylic acid functionalized fluoro compound present in an amount of from about 0.01 to about 10 weight percent of solids and which functionalized fluoro compound is selected from the group consisting of octafluoroadipic acid $HOOC(CF_2)_4COOH$, dodecafluorosuberic acid $HOOC(CF_2)_6COOH$, hexadecafluorosebacic acid $HOOC(CF_2)_8COOH$, heptadecafluoro-n-nonanoic acid $CF_3(CF_2)_7COOH$, nonadecafluorodecanoic acid $CF_3(CF_2)_8COOH$, nonafluorovaleric acid $CF_3(CF_2)_3COOH$, pentadecafluorooctanoic acid $CF_3(CF_2)_6COOH$, undecafluorohexanoic acid $CF_3(CF_2)_4COOH$ and mixtures therefore and wherein said conductive component is carbon black.

2. An intermediate transfer member in accordance with claim 1 wherein said carboxylic acid functionalized fluoro compound is selected from a group consisting of octafluoroadipic acid $HOOC(CF_2)_4COOH$, and dodecafluorosuberic acid $HOOC(CF_2)_6COOH$.

3. An intermediate transfer member in accordance with claim 1 wherein said carboxylic acid functionalized fluoro compound is dodecafluorosuberic acid, hexadecafluorosebacic acid or octafluoroadipic acid.

4. An intermediate transfer member in accordance with claim 1 wherein said carboxylic acid functionalized fluoro compound reacts with said polyimide, and said polyimide is a thermosetting polyimide.

5. An intermediate transfer member in accordance with claim 4 wherein said thermosetting polyimide is generated from curing at a temperature of from about $190°$ C. to about $325°$ C. a polyamic acid selected from the group consisting of the polyamic acid of biphenyl tetracarboxylic dianhydride/4,4'-oxydianiline and a polyamic acid of pyromellitic dianhydride/4,4'-oxydianiline.

6. An intermediate transfer member in accordance with claim 4 wherein the thermosetting polyimide is generated from curing of a component selected from the group consisting of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and mixtures thereof.

7. An intermediate transfer member in accordance with claim 1 wherein said carboxylic acid functionalized fluoro compound is dodecafluorosuberic acid and wherein said intermediate transfer member accepts a xerographic developed toner image from a photoconductor and which accepted image is subsequently transferred to paper and fixed thereon.

8. An intermediate transfer member in accordance with claim 7 wherein said dodecafluorosuberic acid reacts with said polyimide and said polyimide is a thermosetting polyimide.

9. An intermediate transfer member in accordance with claim 1 wherein said carboxylic acid functionalized fluoro compound is present in an amount of from about 0.1 to about 5 weight percent of solids.

10. An intermediate transfer member in accordance with claim 1 wherein for each ingredient the polyimide is present in an amount of from about 70 to about 95 weight percent, the carboxylic acid functionalized fluoro compound is present in an amount of from about 0.1 to about 2 weight percent, and the conductive component is present in an amount of from about 3 to about 40 weight percent, with the total of said ingredients being about 100 percent of solids.

11. An intermediate transfer member in accordance with claim 1 wherein the member has a resistivity of from about $10^9$ to about $10^{13}$ ohm/square.

12. An intermediate transfer member in accordance with claim 1 that self releases from a metal substrate.

13. An intermediate transfer member in accordance with claim 12 wherein the resulting released film is deposited on a supporting substrate.

* * * * *